United States Patent Office 3,480,805
Patented Nov. 25, 1969

3,480,805
MAGNETOHYDRODYNAMIC APPARATUS
John Stuart Yerrell, Stafford, England, assignor to The English Electric Company, Limited, London, England, a British company
Filed Sept. 8, 1966, Ser. No. 577,936
Claims priority, application Great Britain, Sept. 8, 1965, 38,363/65
Int. Cl. H02k 45/00
U.S. Cl. 310—11                                9 Claims

ABSTRACT OF THE DISCLOSURE

A pair of MHD electrode assemblies each comprising a main electrode in a hollow body set back from the wall of the MHD duct, the body having a constricted nozzle formed in an auxiliary electrode which is flush with the duct wall. The plasma jet from the main electrode is maintained through this nozzle.

---

Figure 1:
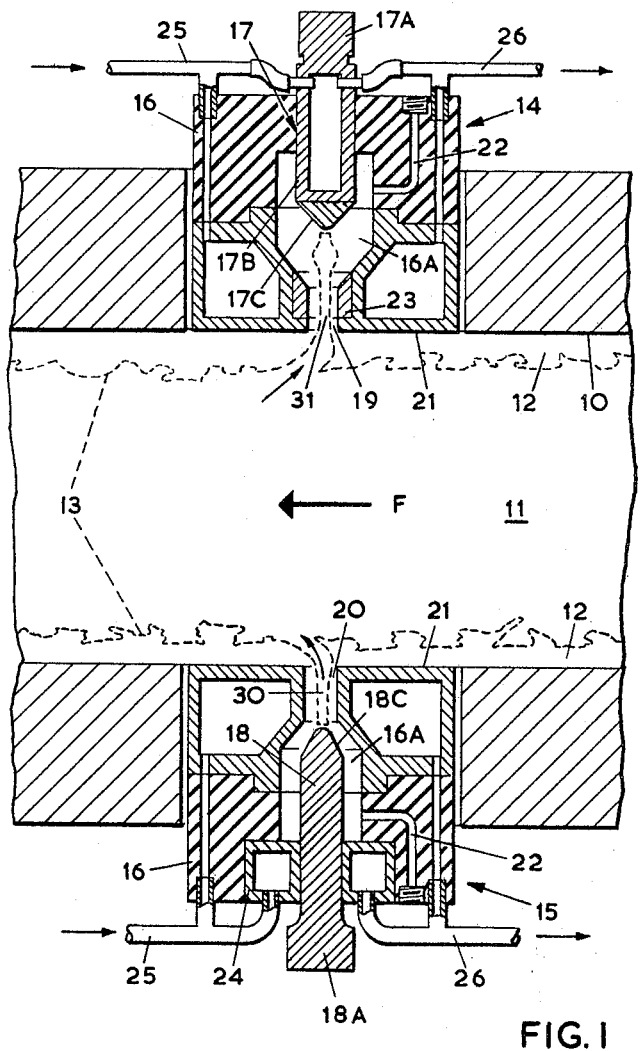

This invention relates to magnetohydrodynamic (hereinafter called "MHD") apparatus including a duct for passage of a hot electrically conducting gas stream therethrough and a pair of electrode assemblies comprising a cathode and anode disposed in the wall of the duct.

In such apparatus electricity can be generated by applying to the duct a magnetic field, the movement of the hot gas stream through the magnetic field causing a voltage to be set up between the cathode and anode, so that if the cathode and anode are connected together through a load, a current flows through the load.

In this specification, "cathode" means an electrode assembly including an electron-emitting electrode, constituting a positive terminal of the MHD generating apparatus, and "anode" means an electrode assembly including an electron-collecting electrode constituting a negative terminal of the apparatus.

According to one aspect of the invention, in such apparatus each electrode assembly includes a main electrode having an electrode tip in a hollow space which is disposed outwardly from the duct wall and which communicates with the interior of the duct through a constricted nozzle, and stabilizing means for maintaining a stabilized arc through said nozzle whereby a plasma jet can extend between the electrode tip and said gas stream through said nozzle.

Preferably, each said stabilizing means includes means for introducing a stabilizing gas into the corresponding said hollow space whereby to stabilize said arc.

Each electrode tip is preferably of refractory material.

According to a preferred feature of the invention, each electrode assembly includes a body portion, the corresponding said main electrode being mounted in the body portion for removal outwardly therefrom. The position of each main electrode relative to the duct wall is preferably adjustable in said body portion.

According to another preferred feature of the invention, each electrode assembly includes an auxiliary electrode constituting part of the duct wall and insulated electrically from the corresponding main electrode, the corresponding said nozzle being formed in said auxiliary electrode.

According to a further preferred feature of the invention, each main electrode and the corresponding auxiliary electrode are connected in circuit with alternating-current supply means so that on starting up the apparatus, said supply means being in operation, a spark can be generated between the said main and auxiliary electrodes whereby to break down the inert gas therebetween electrically and so enable said plasma jets to be established when an electrical load is connected between the cathode and anode. Preferably, each said alternating-current supply means comprises a radio-frequency spark generator.

According to yet another preferred feature of the invention, each main electrode and the corresponding auxiliary electrode are connected in circuit with direct-current supply means so that during starting of the apparatus each electrode assembly can operate as a plasma generator, whereby to enable said plasma jets to be established.

According to another aspect of the invention, an electrode assembly for MHD apparatus, arranged to be mounted in the wall of a duct in such apparatus includes a main electrode having an electrode tip in a hollow space within the assembly, said hollow space communicating with the outside of the assembly through a constricted nozzle, and means for introducing a stabilizing gas into said hollow space.

Figure 2:
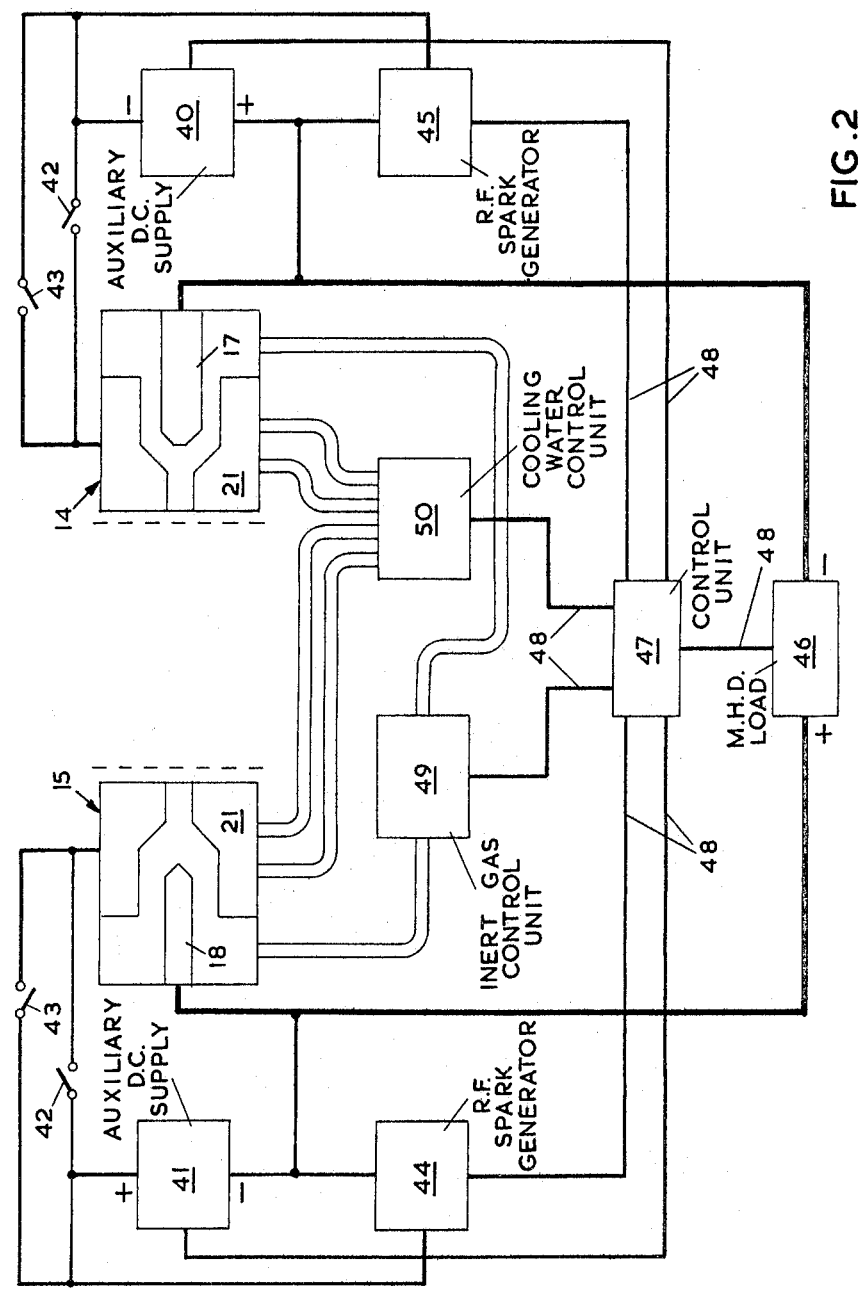

MHD apparatus in one preferred form according to the invention will now be described by way of example and with reference to the accompanying drawings, of which FIG. 1 is a section through an MHD duct and pair of electrode assemblies forming part of the apparatus, and FIG. 2 is a simplified block diagram showing in outline one possible control system for and included in the apparatus.

With reference firstly to FIG. 1, the apparatus includes an MHD duct 10 in which there flows, in the direction of the arrow F, a high-velocity main stream 11 of hot electrically conducting gas flame, the thermal and aerodynamic boundary layer of which is indicated by the space 12 between the broken lines 13 and the wall of the duct 10. Means (not shown) are provided for causing a magnetic field to exist in the duct, so that an electric current will be generated by the flow of the electrically conducting hot gas in the magnetic field.

Arranged in opposite walls of the duct 10 are an anode 14 and a cathode 15. The anode 14 and cathode 15 each comprise a hollow body 16 of insulating material carrying an electrode 17, 18 respectively, the tip 17C, 18C of each electrode being within the hollow space 16A of the corresponding body 16 but communicating with the interior of the duct 10 through a relatively narrow nozzle 19, 20, respectively. Each nozzle 19, 20 comprises a short cylindrical channel formed (coaxially with the corresponding electrode) in a hollow water-cooled plated copper auxiliary electrode 21. Each auxiliary electrode 21 is fixed to the corresponding body 16 between the body 16 and the duct 10.

The electrodes 17 and 18 are replaceable, and their transverse position with respect to duct 10 is adjustable. Each electrode has an electrical connection 17A, 18A respectively on its outboard end and a tip 17C, 18C respectively at its inboard end; while each of the two hollow spaces 16A containing the respective electrode tips 17C, 18C communicates through a duct 22 with a connection for the introduction of a suitable inert gas into the space 16A.

The anode 14 and cathode 15 differ in the following respects. The anode electrode 17 comprises a hollow water-cooled copper shank 17B held removably in the anode body 16 and having a tungsten tip 17C, while the cathode electrode 18 comprises a solid replaceable thoriated tungsten rod, held removably in a hollow water-cooled holder 24 which is fixed at the outboard end of the cathode body 16. A graphite insert 23 is provided in the nozzle 19 of the anode, while the nozzle 20 of the cathode is plain, without an insert. The anode 14 is required to dissipate more heat than the cathode 15.

Cooling-water inlet and outlet connections 25, 26 respectively are provided on both the cathode and anode, being connected into the auxiliary electrodes 21, anode electrode shank 17B and cathode electrode holder 24.

In operation, argon gas is fed into the spaces 16A through the ducts 22 so as to surround the tips of the electrodes 17 and 18 with a protective atmosphere. A constricted arc column traverses the cathode nozzle 20, by which the arc column is stabilized, the arc column forming part of a plasma jet indicated at 30 which extends out of the nozzle 20. On traversing the aerodynamic and thermal boundary layer, this plasma jet 30 is distorted and finally makes contact with the main stream 11, the current then becoming diffuse and losing its constricted form.

A second plasma jet, on the opposite side of the main stream 11, crosses the thermal and aerodynamic boundary layer 12 and links the stream 11 electrically to the anode electrode tip 17C. It will be understood that it is the argon in the spaces 16A that enables the plasma jets 30, 31 to be produced, as well as providing a protective atmosphere for the electrodes 17 and 18. An electrical connection is thus created between the cathode 15 and anode 14 through the main stream of flame 11.

It will be seen that it is possible to operate either the cathode 15 or anode 14, or both, as plasma generators in their own right, current being carried from the respective electrodes 18 and 17 through the nozzles 20 and 19. When the electrode assemblies are used in this way with an external power supply, plasma jets 30 and 31 again extend into the main stream 11, but there will be no net current transfer between cathode and anode.

The purpose of the graphite insert 23, which may be of any other suitable refractory substance (for example tungsten), is to improve the performance of the anode 14 when the latter is operating as a plasma generator.

In some cases it may be necessary during startup of the apparatus to operate both the cathode and the anode briefly as plasma generators, as described above.

With reference now to FIG. 2, one typical control system for MHD apparatus according to the invention includes auxiliary D.C. supply units 40 and 41, of which the positive and the negative poles are connected to the electrodes 17 and 18 of the anode 14 and cathode 15 respectively. The other poles thereof are connected, each through a switch 42, with the corresponding auxiliary electrodes 21.

Two radio-frequency spark generators 44 and 45 are provided, each having one output terminal connected through a switch 43 to the corresponding auxiliary electrode 21. The other output terminals of the spark generators 44, 45 are connected to the anode and cathode electrodes 17 and 18 respectively.

FIG. 2 also indicates an electrical load 46 connected between the cathode 14 and anode 15. Also shown is a control unit 47 having seven output lines 48 for transmitting control signals to the load 46, to an inert-gas control unit 49, to a cooling-water control unit 50, to each of the two spark generators 44, 45 and to each auxiliary D.C. supply unit 40, 41, respectively.

In starting up the apparatus, the control unit 47 is operated to disconnect the load 46 and bring into operation the inert-gas control unit 49 and cooling-water control unit 50. It is also operated to excite the spark generators 44, 45. In this case the auxiliary supply units 40 and 41 are not used. On the switches 43 being closed a spark between each electrode 17, 18 and its corresponding auxiliary electrode 21 breaks down electrically the argon supplied from the inert-gas control unit 49 to the ducts 22 and thence to the spaces 16A around the electrodes. The main stream 11 being established, control unit 47 is then operated to connect the load 46 across the generating apparatus; the plasma jets 30, 31 (FIG. 1) can thus be initiated, whereupon the switches 43 can be opened and the control unit 47 operated to de-energize the spark generators 44 and 45.

Other possible methods of starting up will, however, also suggest themselves. In some cases it may be found unnecessary to provide a radio-frequency spark if the open-circuit potential of the apparatus is sufficient to break down the gap between the main stream 11 and each electrode 17, 18 (which may occur through the auxiliary electrodes 21 transiently), so as to allow the plasma jets 30, 31 to form. In such a case the spark generators 44, 45 and auxiliary supplies 40, 41 will not be needed.

If this is not sufficient, however, a third way of breaking this gap down is to run the cathode and the anode for a short time, each as a self-contained plasma generator and each on its own external power supply 40 or 41, as the case may be, the process being initiated respectively from the spark generators 45 and 44 until the plasma jets 30 and 31 have become established.

It will be understood that in an arrangement according to the invention the wall of the duct 10 is required to withstand substantially only thermal loading. The duct walls may in fact comprise on each side of the duct a continuous series of electrode assemblies (cathodes on one side, anodes on the other), separated from each other only by insulation.

In addition, the form of each electrode assembly according to the invention may be substantially different from the examples described, though each electrode assembly will still have an electrode with its tip in a space disposed outwardly from the duct wall and communicating with the gas stream through a restricted nozzle, together with means for maintaining a stabilized arc through the nozzle.

The electrodes 17, 18 can be of any suitable material or materials. The whole of the anode electrode 17 may if desired be of refractory material such as that of which the tip 17C is made in the example described.

Any other suitable gas may be used in place of argon, for example helium. Nitrogen may also be used.

The auxiliary electrodes 21 may be of any suitable material able to withstand the temperatures and the thermal and aerodynamic stresses involved.

The insert 23 may in some cases be omitted.

I claim:

1. Magnetohydrodynamic apparatus comprising a duct for passage of a hot electrically conducting gas stream therethrough, a pair of electrode assemblies comprising a cathode and anode disposed in the wall of the duct, wherein each electrode assembly comprises a main electrode having an electrode tip in a hollow space which is disposed outwardly from the duct wall and which communicates with the interior of the duct through a constricted nozzle, stabilizing means communicating with said hollow space for maintaining a stabilized arc through said nozzle whereby a plasma jet can extend between the electrode tip and said gas stream through said nozzle, each electrode assembly comprising an auxiliary electrode constituting part of the duct wall and insulated electrically from the corresponding main electrode, the said nozzle of each electrode assembly being formed in the auxiliary electrode thereof.

2. Magnetohydrodynamic apparatus according to claim 1, wherein each said stabilizing means comprises means for introducing a stabilizing gas into the corresponding said hollow space whereby to stabilize said arc.

3. Magnetohydrodynamic apparatus according to claim 1, wherein each said stabilizing means comprises means for introducing an inert gas into the corresponding said hollow space whereby to stabilize said arc and to provide a protective atmosphere around the corresponding electrode tip.

4. Magnetohydrodynamic apparatus according to claim 1, wherein each electrode assembly comprises a body portion and the corresponding said main electrode mounted removably in the body portion for removal outwardly therefrom.

5. Magnetohydrodynamic apparatus according to claim 1, wherein each electrode assembly comprises an auxiliary electrode constituting part of the duct wall, fixed to the body portion between the body portion and the interior of the duct and insulated electrically from the corresponding main electrode, the said nozzle of each electrode assembly being formed in the auxiliary electrode thereof and the body portions being of insulating material.

6. Magnetohydrodynamic apparatus according to claim 4, including a solid said main electrode of refractory material mounted in the corresponding said body portion by means of a thermally conducting hollow support member connected with cooling means for cooling the support member internally.

7. Magnetohydrodynamic apparatus according to claim 1, wherein one of said constricted nozzles is provided with an annular refractory insert.

8. Magnetohydrodynamic apparatus according to claim 1, wherein each said stabilizing means comprises means for introducing an inert gas into the corresponding said hollow space whereby to stabilize said arc, and wherein each main electrode and the corresponding auxiliary electrode are connected in circuit with alternating-current spark generator means so that on starting up the apparatus, the said spark generator means being in operation, a spark can be generated thereby between the said main and auxiliary electrodes whereby to break down the inert gas therebetween electrically and so enable said plasma jets to be established when an electrical load is connected between the cathode and anode.

9. Magnetohydrodynamic apparatus according to claim 1, wherein each said stabilizing means comprises means for introducing an inert gas into the corresponding said hollow space whereby to stabilize said arc, and wherein each main electrode and the corresponding auxiliary electrode are connected in circuit with direct-current supply means so that during starting of the apparatus each electrode assembly can operate as a plasma generator, whereby to enable said plasma jets to be established.

References Cited

UNITED STATES PATENTS

| | | | |
|---|---|---|---|
| 3,204,076 | 8/1965 | Browning | 219—75 |
| 3,375,392 | 3/1968 | Brzozowski | 313—231 |

FOREIGN PATENTS

| | | |
|---|---|---|
| 1,330,199 | 5/1963 | France. |

DAVID X. SLINEY, Primary Examiner